United States Patent [19]
Hayashi et al.

[11] Patent Number: 5,429,758
[45] Date of Patent: Jul. 4, 1995

[54] GRAFT COPOLYMERS PREPARED FROM SOLVENT-FREE REACTIONS AND DISPERSANT DERIVATIVES THEREOF

[75] Inventors: Katsumi Hayashi, Mentor, Ohio; T. Robert Hopkins, Sebring, Fla.; Curtis R. Scharf, Wickliffe, Ohio

[73] Assignee: The Lubrizol Corporation, Wickliffe, Ohio

[21] Appl. No.: 573,608

[22] Filed: Aug. 27, 1990

Related U.S. Application Data

[62] Division of Ser. No. 810,944, Dec. 19, 1985, abandoned.

[51] Int. Cl.$^6$ ............... C10M 145/16; C10M 147/04; C10M 149/08
[52] U.S. Cl. ................... 252/56 R; 252/56 D; 252/50
[58] Field of Search ............ 252/56 D, 56 R, 50; 525/280, 285

[56] References Cited

U.S. PATENT DOCUMENTS

| | | | |
|---|---|---|---|
| 2,524,424 | 10/1950 | Buret | 260/79.5 |
| 2,845,403 | 7/1958 | Gunberg | 260/78.4 |
| 2,993,057 | 7/1961 | Gleason | 260/346.6 |
| 3,240,762 | 3/1966 | Wilks et al. | 260/78.4 |
| 3,365,411 | 1/1968 | Mertzweiller et al. | 260/29.7 |
| 3,527,736 | 9/1970 | Aeyelts Averink et al. | 260/78.4 |
| 3,567,691 | 3/1971 | van Breen et al. | 260/78.4 |
| 3,766,215 | 10/1973 | Hesse et al. | 260/346.8 |
| 3,887,527 | 6/1975 | Okamura et al. | 260/78.4 |
| 3,935,140 | 1/1976 | Go et al. | 260/19 UA |
| 3,952,023 | 4/1976 | Kaija et al. | 260/346.8 R |
| 3,953,541 | 4/1976 | Fieji | 260/878 R |
| 3,998,912 | 12/1976 | Zeitler et al. | 260/878 R |
| 4,010,223 | 3/1977 | Caywood, Jr. | 260/875 |
| 4,033,888 | 7/1977 | Kiovsky | 252/56 D |
| 4,073,737 | 2/1978 | Elliott | 252/51.5 A |
| 4,077,893 | 3/1978 | Kiovsky | 252/56 R |
| 4,080,493 | 3/1978 | Yasui et al. | 526/192 |
| 4,082,817 | 4/1978 | Tmaizumi et al. | 260/879 |
| 4,089,794 | 5/1978 | Engel et al. | 252/51.5 A |
| 4,117,036 | 9/1978 | Honda et al. | 260/878 R |
| 4,137,185 | 1/1979 | Gardiner et al. | 252/33 |
| 4,141,847 | 2/1979 | Kiovsky | 252/51.5 A |
| 4,145,298 | 3/1979 | Trepka | 252/51.5 A |
| 4,160,739 | 7/1979 | Stambaugh et al. | 252/34 |
| 4,161,452 | 7/1979 | Stambaugh et al. | 252/34 |
| 4,161,571 | 7/1979 | Yasui et al. | 526/90 |
| 4,284,414 | 8/1981 | Bryant | 44/62 |
| 4,292,414 | 9/1981 | Saito et al. | 525/255 |
| 4,320,019 | 3/1982 | Hayashi | 252/51.5 A |
| 4,357,250 | 11/1982 | Hayashi | 252/51.5 A |
| 4,410,656 | 10/1983 | Coran et al. | 524/529 |
| 4,412,087 | 10/1983 | Trepka | 585/12 |
| 4,486,573 | 12/1984 | Hayashi | 525/285 |
| 4,505,834 | 3/1985 | Papay et al. | 252/51.5 A |
| 4,508,874 | 4/1985 | Hergenrother et al. | 525/285 |
| 4,578,429 | 3/1986 | Gergen | 525/291 |
| 4,594,378 | 6/1986 | Tyston et al. | 524/106 |
| 4,596,663 | 6/1986 | Hayashi | 252/51.5 A |

FOREIGN PATENT DOCUMENTS

| | | | |
|---|---|---|---|
| 0171167 | 6/1985 | European Pat. Off. | C08F 255/00 |
| 1548464 | 10/1977 | United Kingdom | C08F 8/00 |

Primary Examiner—Margaret Medley
Attorney, Agent, or Firm—James L. Cordek; Frederick D. Hunter; Joseph P. Fischer

[57] ABSTRACT

Compositions useful as oil additives are prepared in a solvent or a solvent free system by reacting (B) an unsaturated carboxylic acid reagent with (A) a hydrogenated block copolymer in the presence of (C) free radical initiators. The formed reaction product (D) can be further reacted with a (E) primary amine-containing compound in a solvent or a solvent free system.

11 Claims, No Drawings

GRAFT COPOLYMERS PREPARED FROM SOLVENT-FREE REACTIONS AND DISPERSANT DERIVATIVES THEREOF

This is a divisional of application Ser. No. 06/810,944 filed on Dec. 19, 1985 now abandoned.

TECHNICAL FIELD

The present invention relates to a solvent-free or a solvent (D) reaction product of (B) an unsaturated carboxylic acid reagent with (A) a hydrogenated block copolymer in the presence of (C) free radical initiators. The present invention further relates to preparation of (E) dispersant derivatives of said (D) reaction product with a primary amine containing compound.

BACKGROUND

Heretofore various solution reactions have been carried out between a polymer and an anhydride.

For example, U.S. Pat. No. 2,524,424 to Buret relates to the treatment of the rubber-like polymers from butadiene hydrocarbons with carboxylic acid anhydrides.

U.S. Pat. No. 2,845,403 to Gunberg relates to making rubbery adducts by chemical reaction of maleic anhydride with butyl rubber.

U.S. Pat. No. 2,993,057 to Gleason relates to copolymers prepared from multiolefins and vinyl aromatic compounds which have a hydrocarbon group attached to the alpha position of the vinyl group.

U.S. Pat. No. 3,240,762 to Wilks, et al. relates to a maleic anhydride hydrogenated polycyclopentadiene reaction product.

U.S. Pat. No. 3,365,411 to Mertzweiller relates to a blend of (1) a polymeric half ester of a hydroxylated polymer and a saturated or unsaturated polycarboxylic acid or anhydride or its amination product with (2) a polymeric adduct of a polymer or copolymer of a conjugated diolefin and an unsaturated polycarboxylic acid anhydride or its amination product.

U.S. Pat. No. 3,527,736 to Averink, et al. relates to the improvement of green strength of synthetic diene polymers (lithium-polyisoprene) by the reaction with an olefinic unsaturated 1,2-dicarboxylic acid (maleic anhydride) in a solvent.

U.S. Pat. No. 3,567,691 to van Breen, et al. relates to a process for the preparation of reaction products of a synthetic diene rubber with maleic anhydride.

U.S. Pat. No. 3,766,215 to Hesse, et al. relates to a process for the preparation of adducts from maleic anhydride and liquid, low-molecular weight polybutadienes.

U.S. Pat. No. 3,887,527 to Okamura, et al. relates to modifying cis-1,4-polyisoprene rubber with maleic anhydride with substantially no increase in gel.

U.S. Pat. No. 3,935,140 to Go, et al. relates to an aqueous coating composition having a water soluble or dispersible material prepared by the addition reaction of at least one alpha-beta unsaturated dicarboxylic compound with a mixture of a natural drying oil and a specific liquid copolymer containing 1,3-pentadiene and 1,3-butadiene units therein.

U.S. Pat. No. 3,952,023 to Kaiya relates to preparing an adduct of (A) a butadiene lower polymer or butadiene lower copolymer and (B) an alpha-beta ethylenically unsaturated dicarboxylic acid compound by a method characterized in that said (A) and (B) are caused to react in the presence of one or more compounds selected from (C) p-phenylenediamine derivatives.

U.S. Pat. No. 3,953,541 to Fuji relates to a process for the preparation of polyolefin graft copolymers.

U.S. Pat. No. 3,998,912 to Zeitler, et al. relates to grafting carboxylic acids onto copolymers of ethylene and carboxylates.

U.S. Pat. No. 4,033,888 to Kiovsky relates to lubricating oil additives allegedly having both dispersant and viscosity index improving properties which are prepared by reacting a block copolymer with maleic anhydride and an alkane polyol.

British Patent 1,548,464 to Shell relates to reacting a hydrogenated block copolymer with maleic anhydride and the subsequent reaction thereof with an amine containing compound.

U.S. Pat. No. 4,082,817 to Imaizumi, et al. relates to a process for producing a maleic anhydride adduct of high molecular weight 1,2-polybutadiene.

U.S. Pat. No. 4,073,737 to Elliott relates to hydrogenated copolymers of conjugated dienes and optionally, vinyl aromatic monomers which are useful as oil additives.

U.S. Pat. No. 4,410,656 to Coran, et al. relates to a method of masticating diene rubber in the presence of maleic acid or maleic anhydride together with sulfur or an organic sulfur compound capable of generating a thiyl radical.

U.S. Pat. No. 4,010,223 to Caywood relates to an adduct containing succinic groups attached to an elastomeric copolymer of an EPDM type copolymer. The reaction is carried out free of any free radical initiators.

U.S. Pat. No. 4,080,493 to Yasui, et al. relates to a process for the production of the maleic anhydride adduct of a liquid polymer.

U.S. Pat. No. 4,089,794 to Engle, et al. relates to polymeric dispersant additives for lubricating oils comprising ethylene and one or more $C_3$ to $C_{28}$ alpha-olefins which have been solution-grated in the presence of a free radical initiator with an ethylenically unsaturated carboxylic acid material in elevated temperatures and thereafter reacted with a polyfunctional material reactive with carboxylic groups such as polyamine, or a polyol.

U.S. Pat. No. 4,117,036 to Honda, et al. relates to functional high polymeric substances having alpha, beta, unsaturated carboxylate and the compositions therefrom.

U.S. Pat. Nos. 4,160,739 and 4,161,452 to Stambaugh, et al. relate to polyolefinic copolymer additives for lubricants and fuels wherein the backbone can be styrene-butadiene copolymers and the grafted units are the residues of a monomer system comprising maleic acid or anhydride with one or more other monomers copolymerizable therewith. Further reaction with amine compounds are disclosed.

U.S. Pat. No. 4,161,571 to Yasui, et al. relates to a process for the production of the maleic anhydride adduct of a liquid polymer.

U.S. Pat. No. 4,284,414 to Bryant relates to mixed alkyl esters of interpolymers for use in crude oils.

U.S. Pat. No. 4,292,414 to Saito, et al. relates to a process for preparing modified block copolymers by graft reacting at least one maleic acid compound with an aromatic vinyl compound/conjugated diene compound block copolymer.

U.S. Pat. No. 4,505,834 to Papay relates to lubricating oil compositions containing graft copolymers as a viscosity index improver-dispersant.

U.S. Pat. No. Nos. 4,077,893 and 4,141,847 to Kiovsky relate to lubricating oil additives allegedly having both dispersant and viscosity index improving properties which are prepared by hydrogenating star-shaped polymers of at least four arms of polymers or copolymers of dienes and monoalkenyl arenes with an alpha-beta unsaturated carboxylic acid and then reacting the resulting intermediate with either a polyol or an amine.

U.S. Pat. No. 4,145,298 to Trepka relates to nitrogen-containing copolymers which are prepared by the reaction of lithiated hydrogenated conjugated diene-vinylarene copolymers with nitrogen-containing organic compounds.

U.S. Pat. No. 4,320,019 to Hayashi relates to reaction products prepared by reacting EPDM type copolymers with olefinic carboxylic acid acylating agents to form an acylating reaction intermediate which is further reacted with an amine.

U.S. Pat. No. 4,486,573 to Hayashi relates to hydrocarbyl substituted carboxylic acid reagents containing from about 2 to about 20 carbon atoms, exclusive of the carboxyl-based groups with one more more high molecular weight olefin polymers having 1 to 20 carbon atoms.

SUMMARY OF THE INVENTION

Accordingly, it is an aspect of the present invention to provide a composition of matter which has been formed by reacting a hydrogenated block copolymer with unsaturated carboxylic reagents in the presence of free radical initiators in a solvent-free system.

It is a further aspect of the present invention to produce a composition of matter, as above, wherein said reaction product can further be reacted with a primary amine containing compound.

These and other aspects of the present invention will become apparent from the following specification which describes in detail the preparation of the composition.

In general, a composition of matter comprises the solvent-free reaction product of:

(A) a hydrogenated block copolymer comprising a normal block copolymer or a random block copolymer, said normal block copolymer made from a vinyl substituted aromatic and an aliphatic conjugated diene, said normal block copolymer having from two to about five polymer blocks with at least one polymer block of said vinyl substituted aromatic and at least one polymer block of said hydrogenated aliphatic conjugated diene, said random block copolymer made from vinyl substituted aromatic and aliphatic conjugated diene monomers, the total amount of said vinyl substituted aromatic blocks in said block copolymer being in the range of from about 20 percent to about 70 percent by weight and the total amount of said diene blocks in said block copolymer being in the range of from about 30 percent to about 80 percent by weight; the number average molecular weight of said normal block copolymer and said random block copolymer being in the range of about 10,000 to about 500,000;

(B) an alpha-beta olefinic unsaturated carboxylic reagent including functional derivatives thereof containing 2 to about 20 carbon atoms exclusive of the carboxyl-based groups in an amount from about 0.25 percent to about 20 percent by weight based upon the total weight of said (A) block copolymers and said (B) unsaturated carboxylic reagent; and from about 0.01 to about 5 percent by weight of (C) a free radical initiator based upon the weight of said (A) block copolymer and said (B) unsaturated carboxylic reagent.

Furthermore, a composition comprises:

the (D) reaction product of (A), (B) and (C), set forth immediately above, and (E) a primary amine containing compound.

DESCRIPTION OF PREFERRED EMBODIMENTS

According to the present invention, a composition of matter suitable for use as a viscosity improver/dispersant is made by reacting a (A) hydrogenated block copolymer and (B) an alpha-beta olefinically unsaturated reagent in the presence of (C) free radical initiators. The reaction product of (A), (B) and (C) is referred to as acylating reaction product (D) which can be further reacted with (E) a primary amine containing compound. Reaction product (D) can be carried out in a solvent such as mineral oil or in a solvent-free environment.

Considering the (A) hydrogenated block copolymer, it comprises either a normal block copolymer, that is, a true block copolymer or a random block copolymer. Considering the true or normal block copolymer, it is generally made from conjugated dienes having from 4 to 10 carbon atoms and preferably from 4 to 6 carbon atoms as well as from vinyl substituted aromatics having from 8 to 12 carbon atoms and preferably 8 or 9 carbon atoms.

Examples of vinyl substituted aromatics include styrene, alpha-methylstyrene, ortho-methylstyrene, meta-methylstyrene, para-methylstyrene, para-tertiary-butylstyrene, with styrene being preferred. Examples of such conjugated dienes include piperylene, 2,3-dimethyl-1,3-butadiene, chloroprene, isoprene and 1,3-butadiene, with isoprene and 1,3-butadiene being particularly preferred. Mixtures of such conjugated dienes are useful.

The normal block copolymers have a total of from 2 to about 5, and preferably 2 or 3, polymer blocks of the vinyl substituted aromatic and the conjugated diene with at least one polymer block of said vinyl substituted aromatic and at least one polymer block of said conjugated diene being present. The conjugated diene block is hydrogenated as more fully set forth hereinbelow. The normal block copolymers can be linear block copolymers wherein a substantially long sequence of one monomeric unit (Block I) is linked with another substantially long sequence of a second (Block II), third (Block III), fourth (Block IV), or fifth (Block V) monomeric unit. For example, if A is a styrene monomeric unit and D is a conjugated diene monomeric unit, a tri-block copolymer of these monomeric units can be represented by the formula:

```
aaaa-----aa-----ddd-----ddd-----aaa-----aa
Block I         Block II        Block III Linear ada Block
```

These copolymers can also be radial block copolymers wherein the polymer blocks are linked radially as represented by the formula:

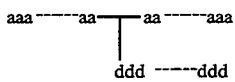

Radial ad Block

In practice, the number of repeat units involved in each polymer block usually exceeds about 500, but it can be less than about 500. The sequence length in one block should be long enough so that the block copolymer exhibits the inherent homopolymeric physical properties such as glass transition temperature and polymer melt temperature.

The vinyl substituted aromatic content of these copolymers, that is the total amount of vinyl substituted aromatic blocks in the normal block copolymer, is in the range of from about 20 percent to about 70 percent by weight and preferably from about 40 percent to about 60 percent by weight. Thus, the aliphatic conjugated diene content, that is, the total diene block content, of these copolymers is in the range of from about 30 percent to about 80 percent by weight and preferably from about 40 percent to about 60 percent by weight.

These normal block copolymers can be prepared by conventional methods well known in the art. Such copolymers usually are prepared by anionic polymerization using, for example, an alkali metal hydrocarbon (e.g., sec-butyllithium) as a polymerization catalyst.

Examples of suitable normal block copolymers as set forth above include Shellvis-40, and Shellvis-50, both hydrogenated styrene-isoprene block copolymers, manufactured by Shell Chemicals.

Considering the random block copolymer which can be utilized separately, in combination with the nornmal block copolymers set forth above, or not at all, it is generally defined as a block copolymer having one or more block polymer portions therein. More specifically, the random block copolymers can be defined as an indeterminate number of A and D blocks of indeterminate lengths. These random copolymers are generally made from conjugated dienes of the type noted above and hereby incorporated by reference with butadiene or isoprene being preferred. The remaining monomer utilized to make the random block copolymer comprises vinyl substituted aromatics of the type set forth hereinabove and are also hereby fully incorporated by reference. A suitable type of aromatic monomer is styrene. The random block copolymer can be made by simultaneously feeding a mixture of monomers to a polymerization system rather than feeding the monomers in a sequential manner. The amount of the various blocks by weight are the same as set forth above, that is, from about 20 to about 70 percent by weight of vinyl substituted aromatic blocks with 40 to 60 percent by weight of such blocks being preferred. Accordingly, the amount of the diene blocks is the difference. The number average molecular weight and the weight average molecular weight of the random block copolymers are the same as set forth above and accordingly is hereby fully incorporated by reference. The random block copolymers contain significant blocks of a vinyl substituted aromatic repeating unit and/or significant blocks of a conjugated diene repeating unit therein and/or blocks of random or random tapered conjugated diene/vinyl substituted aromatic. These copolymers also can be represented as by A'-B'-A'-B' wherein A' is a block of vinyl substituted aromatic compound, B' is a block of conjugated diene, and the length of A' and B' blocks vary widely and, are substantially shorter than the A and B blocks of a normal block polymer. The amount of the aromatic a block content of the random block copolymer preferably should be in the range of about 15 to about 45, more preferably 25 to about 40 weight percent.

Examples of such commercially available random block copolymers include the various Glissoviscal block copolymers manufactured by BASF. A previous available random block copolymer was Phil-Ad viscosity improver, manufactured by Phillips Petroleum.

Regardless of whether a true or normal block copolymer or a random block copolymer, or combinations of both are utilized, they are hydrogenated before use in this invention so as to remove virtually all of their olefinic double bonds. Techniques for accomplishing this hydrogenation are well known to those of skill in the art and need not be described in detail at this point. Briefly, hydrogenation is accomplished by contacting the copolymers with hydrogen at super-atmospheric pressures in the presence of a metal catalyst such as colloidal nickel, palladium supported on charcoal, etc.

In general, it is preferred that these block copolymers, for reasons of oxidative stability, contain no more than about 5% and preferably no more than about 0.5% residual olefinic unsaturation on the basis of the total number of carbon-to-carbon covalent linkages within the average molecule. Such unsaturation can be measured by a number of means well known to those of skill in the art, such as infrared, NMR, etc. Most preferably, these copolymers contain no discernible unsaturation, as determined by the aforementioned analytical techniques.

The (A) block copolymers typically have number average molecular weights in the range of about 10,000 to about 500,000, preferably about 30,000 to about 200,000. The weight average molecular weight for these copolymers is generally in the range of about 50,000 to about 500,000, preferably about 30,000 to about 300,000.

The unsaturated carboxylic reagent (B) generally contains an alpha-beta olefinic unsaturation. By the term alpha-beta olefinic unsaturated carboxylic acids reagent, it is meant to include alpha-beta olefinic unsaturated carboxylic acids (B) per se and functional derivatives thereof, such as anhydrides, esters, amides, imides, salts, acyl halides, nitriles, and other nitrogen containing compounds. These carboxylic acid reagents may be either monobasic or polybasic in nature. When they are polybiasic they are preferably dicarboxylic acids, although tri- and tetracarboxylic acids can be used. Exemplary of the monobasic alpha-beta olefinically unstaturated carboxylic acid reagents are the carboxylic acids corresponding to the formula:

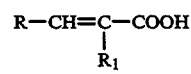

wherein R is hydrogen, or a saturated aliphatic or alicyclic, aryl, alkylaryl or heterocyclic group, preferably hydrogen or a lower alkyl group, and $R_1$ is hydrogen or a lower alkyl group. By lower alkyl it is meant from 1 to 10 carbon atoms. The total number of carbon atoms in R and $R_1$ should not exceed 18 carbon atoms. Specific examples of useful monobasic alpha-beta olefinic unsaturated carboxylic acids are acrylic acid, methacrylic acid, cinnamic acid, crotonic acid, 2-phenyl propenoic acid, etc. Exemplary polybasic acids include maleic acid, fumaric acid, mesaconic acid, itaconic acid and citraconic acid.

The alpha-beta olefinic unsaturated reagents (B) also include functional derivatives of the foregoing acids, as noted. These functional derivatives include the anhydrides, esters, amides, imides, salts, acid halides, and nitriles of the aforedescribed acids. A preferred alpha-beta olefinic unsaturated carboxylic acid reagent (B) is maleic anhydride.

Methods of preparing such functional derivatives are well known to those of ordinary skill in the art and they can be satisfactorily described by noting the reactants used to produce them. Thus, for example, derivative esters for use in the present invention can be made by esterifying monohydric or polyhydric alcohols or epoxides with any of the aforedescribed acids. Amines and alcohols described hereinafter can be used to prepare these functional derivatives. The nitrile functional derivatives of the aforedescribed carboxylic acid useful in making the products of the present invention can be made by the conversion of a carboxylic acid to the corresponding nitrile by dehydration of the corresponding amine. The preparation of the latter is well known to those skilled in the art and is described in detail in *The Chemistry of the Cyano Group* edited by Zvi Rappoport, Chapter 2, which is hereby incorporated by reference for its relevant disclosures pertaining to methods for preparing nitriles. Specific examples of such nitrogen containing functional derivatives include maleimide and maleamic acid. More specifically, such amine functional derivatives of the alpha-beta olefinic unsaturated reagent (B) can have the formula:

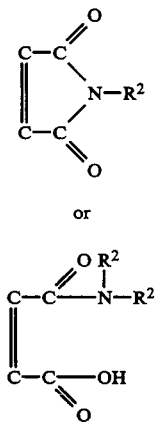

or wherein $R_2$ and $R_3$ independently, can be hydrogen, an alkyl having from about 1 to about 12 carbon atoms and preferably from about 1 to about 6 carbon atoms, an alkyl substituted aromatic having from about 7 to about 12 carbon atoms and preferably from about 7 to about 9 carbon atoms, or a moiety containing N, O or S as hereto atoms. Examples of highly preferred compounds include N-(3,6-dioxaheptyl)maleimide, N-(3-dimethylaminopropyl)maleimide, and N-(2-methoxyethoxyethyl)maleimide.

Ammonium salt derivatives can also be made from any of the amines described hereinafter as well as from tertiary amino analogs of them, ammonia or its derivatives, (e.g., $NH_4Cl$, $NH_4OH$, $(NH_4)_2CO_3$, etc.) by conventional techniques well known to those of ordinary skill in the art.

The acid halide functional derivative of the aforedescribed olefinic carboxylic acid (B) can be prepared by the reaction of the acids and their anhydrides with a halogenation agent such as phosphorus tribromide, phosphorus pentachloride, or thionyl chloride. Esters can be prepared by the reaction of the acid halide with the aforesaid alcohols or phenolic compounds such as phenol, naphthol, octylphenol, etc. Also, amides and imides and other acylated nitrogen derivatives can be prepared by reacting the acid halide with the above-described amino compounds. These esters and acylated nitrogen derivatives can be prepared from the acid halides by conventional techniques well known to those of ordinary skill in the art.

It is important that an effective amount of the (B) reagent be utilized such that sufficient dispersancy is imparted to the (D) acylated reaction product. Often an amount of (B) reagent of from about 0.20 to about 20 percent by weight and desirably from about 0.5 to about 5 percent by weight based upon the total weight of said (A) block copolymer and said (B) reagent is utilized. Generally, such amounts are sufficient to ensure that from about 0.1 percent to about 3 percent by weight of the (D) reaction product is said (B) reagent.

With regard to the solvent-free reaction, the reaction temperature between the (A) hydrogenated block copolymer and the (B) reagent will depend to some extent upon the type of block copolymer as well as the type of the initiator system utilized. Generally, the reaction temperature is from about 100° to about 300° C., desirably from about 160° to about 260° C., preferably from about 220° to about 260° C. Although not necessary, the reaction can be carried out in an inert atmosphere such as nitrogen.

The solvent-free reaction between the hydrogenated block copolymers and the unsaturated carboxylic acids or derivatives thereof can generally take place in any suitable vessel, device or apparatus without the presence of any solvent. Desirably, the reaction occurs in a blending device such as an extruder, an Banbury, a two-roll mill, or the like.

As an optional and important aspect of the present invention, the blending device imparts high mechanical energy to such an extent that sufficient force is applied to the (A) block copolymer chains to cause scission or breakage thereof. The use of such high mechanical energy to cause chain scission is usually not desired. However, it is optionally desired in situations wherein the molecular weight of the block copolymer is greater than desired and hence, is broken down to a suitable range or the viscous nature of the block copolymer requires a high mechanical energy mixing system for processing. Such high mechanical energy devices can be the same type of mixing devices as noted above and generally impart high torque or masticate the ingredients therein. As a side reaction, it is thought that the block copolymer chains so broken produce terminal chain ends which serve as reaction sites for the (B) reagent. Thus, besides causing actual chain scission, it is speculated that the high mechanical energy imparting devices create reaction sites in addition to those created by the (C) free radical initiators. However, it is to be understood that such chain scission creates very few reaction sites compared with the free radical reaction.

In order to promote the reaction and to create reaction sites, free radical initiators are generally utilized. Two types of initiators include the various organic peroxides as well as the various organic azo compounds. The amount of initiators based upon the amount of the (A) block copolymers and the (B) reagent utilized is generally from about 0.01 percent to about 5.0 percent by weight and desirably from about 0.05 percent to about 2.0 percent by weight. Typical organic peroxides include benzoyl peroxide; t-butyl peroxypivalate; 2,4-dichlorobenzoyl peroxide; decanoyl peroxide; propionyl peroxide; hydroxyheptyl peroxide; cyclohexanone peroxide; t-butyl perbenzoate; dicumyl peroxide; 2,5-dimethyl-2,5-di(t-butylperoxyl)-3-hexyne; 2,5-dimethyl-2,5-di(t-butylperoxyl)hexane; 2,5-dimethyl-2,5-dibenzoylperoxyhexane; t-butyl peroxide; cumene hydroperoxide; 2,5-dimethyl-2,5-di(hydroperoxy)hexane; t-butyl hydroperoxide; lauroyl peroxide; t-amyl perbenzoate; and mixtures thereof. Preferred organic peroxides are benzoyl peroxide and t-butyl perbenzoate. Mixtures of two or more of the above peroxides can also be used.

Naturally, handling of the peroxides should be done with the utmost care due to their tendency to decompose or violently react. Hence, the user should be thoroughly familiar with their properties as well as proper handling procedures before any contact therewith.

Examples of suitable organic azo initiators include 2,2'-azobis(2-methylpropionitrile) and 2,2'-azobis(2-methylvaleronitrile) and 4,4'-azobis(4-cyanovaleric acid).

The extent of the reaction of the (B) reagent such as maleic anhydride as incorporated onto the block copolymers is generally measured by a total acid number or TAN. The TAN number desirably is from about 0.1 to about 60 with from about 0.5 to about 20 being preferred. The definition of the TAN number is the mg of KOH required to neutralize the acid functional groups in one gram of the reaction product of (A) block copolymer and (B) alpha-beta olefinically unsaturated carboxylic reagent.

The (D) reaction products of the present invention are useful as intermediates as well as viscosity improvers for multigrade oils.

The present invention will be understood by reference to the following examples.

EXAMPLES I–III

Three commercial viscosity index improvers (VI improvers) were functionalized with maleic anhydride in a laboratory scale extruder. The extruder used in these experiments was a single-screw type driven by a C. W. Brabender Plasti-Corder torque rheometer. No die was used.

To ensure homogeneous extruder feeds, the crumb VI improving polymer was coated with maleic anhydride and tert-butyl peroxide prior to extrusion. This was done by dissolving both maleic anhydride and tert-butyl peroxide in acetone, spraying the acetone solution evenly over the crumb polymer, and allowing the acetone solvent to evaporate. This procedure leaves only the maleic anhydride- and peroxide-coated crumb polymer behind as a residue. More specifically, a homogeneous extruder feed composed of 96.5 percent wt crumb polymer, 3.2 percent wt maleic anhydride, and 0.3 percent wt di-tert-butyl peroxide was charged to the extruder feed zone.

The reaction mixture is conveyed through the three heating zones of the extruder barrel by a single screw. The barrel length of the lab-scale extruder used herein was 18.75 inches. The residence time in each of the three zones of the extruder barrel is given by the following relationship:

$$\text{Approximate Residence Time In Each Zone} = \frac{500 \text{ seconds}}{\text{RPM}}$$

In each of the following three examples the first zone was used only to preheat the extruder feed to a 160° C. initiation temperature. Although reaction of the components commenced, it was at a low rate with most of the reaction occurring in the last two zones. The approximate reaction times are given in the examples.

Example I

Maleinized Shellvis 40
Extruder feed:
760 gm Shellvis 40
26 gm Maleic Anydride
3 gm di-tert-Butyl Peroxide
Extruder screw speed=75 rpm
Residence time at temperature:
7 seconds at 160° C.(Zone 1)
7 seconds at 240° C. (Zone 2)
7 seconds at 260° C. (Zone 3)
Approximate reaction time=21 seconds
TAN 10–15

Example II

Maleinized BASF Glissoviscal CE 5260
Extruder feed:
626 gm Glissoviscal CE
21 gm Maleic Anydride
2 gm di-tert-Butyl Peroxide
Extruder screw speed=50 rpm
Residence time at temperature:
10 seconds at 160° C. (Zone 1)
10 seconds at 240° C. (Zone 2)
10 seconds at 260° C. (Zone 3)
Approximate reaction time=30 seconds
TAN 10–15

Example III

Maleinized Shellvis 50
Extruder feed:
626 gm Shellvis 50
21 gm Maleic Anydride
2 gm di-tert-Butyl Peroxide
Extruder screw speed=50 rpm
Residence time at temperature:
10 seconds at 160° C. (Zone 1)
10 seconds at 240° C. (Zone 2)
10 seconds at 260° C. (Zone 3)
Approximate reaction time=30 seconds
TAN 10–15

In a similar manner, the same blending experiments were carried out at different temperatures as of about 160°, 180°, 200° and 220° C.

The reaction mixture is dissolved as a 10 percent solution in toluene. It is then poured slowly into methyl alcohol with rapid agitation to precipitate the polymer.

The polymer is isolated by decantation and dried in an open dish at about 60° C.

An alternative process is to carry out the above reaction in the presence of one or more solvents to form the (D) acylating reaction product. The solvent used can be any common or conventional solvent such as those known to the art and literature. Convenient and suitable solvents include the various oils which are lubricant base stocks such as natural and/or synthetic lubricating oils set forth hereinbelow. Briefly, natural oils include mineral lubricating oils such as liquid petroleum oils and solvent-treated or acid-treated mineral lubricating oils of the paraffinic-naphthenic or mixed paraffinic-naphthenic types. Animal and vegetable oils can also be used. Synthetic lubricating oils utilized are alkylated aromatics, poly-alpha-olefins, alkylphosphates and the esters derived from polybasic acids, polyols and fatty acids. Examples of solvents include solvent refined 100 to 200 Neutral mineral paraffic and/or naphthenic oils, diphenyldodecanes, didodecylobenzenes, hydrogenated decene, oligomers, and mixtures of the above. The amount of oil should be adjusted so that the viscosity of the reaction mixture is suitable for mixing. Typically, from about 70 percent to about 99 percent by weight of the total reaction mixture as oil can be utilized.

Although in this embodiment of the invention, the reactants are carried out in the presence of a solvent, the various reactants of the same are set forth hereinabove and accordingly are hereby incorporated by reference. For example, the various (A) hydrogenated block copolymers can be either the normal block copolymer set forth hereinabove containing from about 2 to about 5 total block portions or the random block copolymer. The random block copolymer can also have the same number average molecular weight range as set forth hereinabove. The unsaturated carboxylic reagent (B) is the same as set forth hereinabove and accordingly is hereby fully incorporated by reference. The reagent can thus contain alpha-beta olefinic unsaturated carboxylic acids including various functional derivatives thereof having from about 2 to about 20 carbon atoms exclusive of the carboxyl-base groups. The (C) initiators are also the same as set forth hereinabove with regard to the solvent-free reaction and accordingly are hereby incorporated by reference and include the organic peroxides and the various organic azo compounds. The various reaction parameters, conditions, methods and the like are also the same as set forth hereinabove and are also hereby fully incorporated by reference unless otherwise stated below to be different.

The preparation of the (D) acylating reaction product generally conforms to the procedure set forth above except that a solvent, for example a Neutral mineral oil is utilized. Any conventional or suitable reaction vessel or container is utilized such as a reaction flask.

The mineral oil is initially added to the reaction vessel in a desired amount and heated. Inasmuch as the reaction is desirably carried out in an inert atmosphere, the vessel can be initially purged with an inert gas such as nitrogen. Longer resident times are generally required to react the generally larger amount of reactants contained in the reaction vessel. Thus, although the temperatures can be from about 100° C. to about 300° C., they are desirably somewhat lower as from about 130° C. to about 180° C. with from about 140° C. to about 175° C. being preferred. The process is generally carried out by heating the solvent to a suitable reaction temperature.

The (A) block copolymer is then added and allowed to dissolve over a matter of hours as for example a few hours. The (B) alpha-beta olefinic unsaturated carboxylic reagent is then added. The (C) free radical initiator is subsequently added and the reaction conducted at a suitable temperature, as for example, from about 140° C. to about 170° C. Desirably, the initiator is added in a slow manner, for example, dropwise over a period of time as many minutes and even hours. Upon completion of the addition of the (C) initiator, the solvent is held at the reaction temperature for a period of time until a desired yield is obtained, typically for about ½ to about 2 hours. Naturally, much shorter or greater periods of time can be utilized. The (D) acylating reaction product so produced can be utilized as a viscosity improver or an intermediate for further reaction with a (E) primary amine-containing compound.

The invention will be better understood by reference to the following examples.

EXAMPLE IV

A 1750 g sample of a hydrogenated styrene/butadiene copolymer (BASF Glissoviscal CE5260) is charged to a 12-l flask containing 5250 g Sun HPO 100N oil which has been heated to 150° C. During this step and throughout the entire reaction sequence, a $N_2$ blanket and mechanical stirring are maintained. Within 3 hrs. a homogeneous solution is obtained. Thirty-five (35 g) grams of maleic anhydride is charged to the flask and thoroughly dissolved while increasing the reaction temperature to 160° C. A dropwise addition of 14.1 g of the t-butyl peroxide initiator is charged into the reaction mixture over 1 hour. The solution is stirred at 160° C. for 1.5 additional hours. The $N_2$ blanket is then changed to a subsurface purge (2.0 SCFH). The reaction mixture is heated to 170° C. and held 2.0 hours to remove unreacted maleic anhydride and peroxide decomposition products. Infrared assay of the polymer solution confirms the presence of succinic anhydride groups in the product. Treatment of a 50 g aliquot of product with 0.1 g DETA (Diethylenetriamine) at 110° C. causes instantaneous gelation. This confirms that on the average each polymer molecule contains more than one succinic anhydride group. Titration of a toluene solution of the product, with 0.1N $NaOCH_3$, indicates a TAN=5.4 (95% maleic anhydride reacted). Dialysis of the polymer solution shows that 20–30% of the TAN is succinic anhydride attached to the polymer substrate, while 70–80% of the TAN is succinic anhydride attached to the 100N oil.

EXAMPLE V

In a similar manner, a reaction product is prepared utilizing Shellvis 40, a hydrogenated styrene-isoprene block copolymer produced by Shell Chemicals. The amount of Shellvis 40 is 10.0% by weight, the amount of maleic anhydride is 0.50 weight percent and the amount of neutral oil is 89.5 weight percent. These components are charged to a flask in a manner as set forth in Example IV and heated while a dropwise addition of 0.5 weight percent of t-butyl peroxide is charged over a period of 1 hours. The solution is stirred at 160° C. for an additional 1.5 hours. The nitrogen blanket is then changed to a subsurface purge. The reaction mixture is heated to 170° C. and held for 2 hours to remove unreacted maleic anhydride and peroxide of composition products. Infrared assay of the polymer solution confirms the presence of succinic anhydride groups in the product. Treatment of a 50 g aliquot of product with 0.1 g of diethylenetriamine at 110° C. causes a dramatic viscosity increase thus confirming that a significant amount of succinic anhydride groups are attached to the polymer substrate. The TAN was 5.4 (theoretical 5.5). The number average molecular weight is approximately 160,000 and the weight average molecular weight is approximately 200,000.

EXAMPLE VI

In a manner similar to example IV, a reaction product is prepared utilizing Shellvis 50, a hydrogenated styrene-isoprene block copolymer produced by Shell Chemicals, with a lower molecular weight than Shellvis 40. The amount of Shellvis 50 is 14.9 weight percent, the amount of maleic anhydride is 0.3% and the amount of 100 Neutral oil is 84.8 weight percent. The reactants are heated in a manner as set forth in Example IV and then 0.2 weight percent of t-butyl peroxide initiator is charged to the reaction mixture over a period of 1 hour and the solution is stirred at 160° C. for an additional 1.5 hours. As before, the nitrogen blanket is changed to a subsurface purge. The reaction mixture is heated at 170° C. and held for 2 hours to remove unreacted maleic anhydride and peroxide decomposition products. Infrared assay of the polymer solution confirms the presence of succinic anhydride groups in the product. Treatment of a 50 g aliquot of product with 0.1 g of diethylenetriamine at 110° C. causes a significant viscosity increase. This confirms that a significant amount of succinic anhydride groups are attached to the polymer. The TAN was 3.5 (theoretical 3.4) and the polymer solution was clear.

Regardless of whether a solvent-free process is utilized as carried out in an extruder or other apparatus or whether a solution process is utilized, the (D) reaction product is reacted with a (E) primary amine-containing compound. By the term "primary amine-containing compound" is meant ammonia or a compound which contains only one primary amino group therein. That is, although the compound can contain a plurality of nitrogen atoms therein, only one such nitrogen atom forms a primary amine group. Otherwise, undesirable gel is often obtained.

The (E) primary amine-containing compounds of the present invention can broadly be represented by the formula R—NH$_2$ where R is hydrogen, an alkyl, a cycloalkyl, an aromatic, and combinations thereof, e.g., an alkyl substituted cycloalkyl. Furthermore, R can be an alkyl, an aromatic, a cycloalkyl group, or combination thereof containing one or more secondary or tertiary amine groups therein. R can also be an alkyl, a cycloalkyl, an aromatic group, or combinations thereof containing one or more heteroatoms (for example, oxygen, nitrogen, sulfur, etc.). R can further be an alkyl, a cycloalkyl, an aromatic, or combinations thereof containing sulfide or oxy linkages therein. Generally, R is hydrogen or said various R groups containing from 1 to about 25 carbon atoms with from about 1 to about 6 or 7 carbon atoms being desirable. Exemplary of such (E) primary amine-containing compounds are the following wherein R is as set forth immediately hereinabove: ammonia, N,N-dimethylhydrazine, methylamine, ethylamine, butylamine, 2-methoxyethylamine, N,N-dimethyl-1,3-propanediamine, N-ethyl-N-methyl-1,3-propanediamine, N-methyl-1,3-propanediamine, N-(3-aminopropyl)morpholine, 3-alkoxypropylamines wherein the alkoxy group contains from 1 to 18 carbon atoms, usually an alkoxy group having from 1 to 8 carbon atoms and has the formula R$^1$—O—CH$_2$CH$_2$CH$_2$—NH$_2$ such as 3-methoxypropylamine, 3-isobutyoxypropylamine and 3-(alkoxypolyethoxy)-propylamines having the formula R$^1$O(CH$_2$CH$_2$O)$_x$CH$_2$CH$_2$CH$_2$NH$_2$ wherein the alkoxy group is as immediately set forth above and where x is 1 to 50, 4,7-dioxactylamine, N-(3-aminopropyl)-N$^1$-methylpiperazine, N-(2-aminoethyl)piperazine, the various (2-aminoethyl)-pyridines, aminopyridines, 2-aminomethylpyridines, 2-aminomethylfuran, 3-amino-2-oxotetrahydrofuran, N-(2-aminoethyl)pyrrolidine, 2-aminomethypyrrolidine, 1-methyl-2-aminomethylpyrrolidine, 1-aminopyrrolidine, 1-(3-aminopropyl) -2methypiperidine, 4-aminomethylpiperidine, N-(2-aminoethyl)morpholine, 1-ethyl-3-aminopiperidine, 1-aminopiperidine, N-aminomorpholine, and the like.

Of these compounds, N-(3 -aminopropyl)morpholine and N-ethyl-N-methyl-1,3-propanediamine are preferred with N,N-dimethyl-1,3-propanediamine being highly preferred.

Another group of (E) primary amine-containing compounds are the various amine terminated polyethers. A specific example of such a polyether is given by the formula:

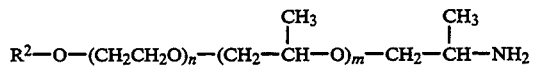

wherein n is from about 0 to about 50 with from about 5 to about 25 being preferred, m is from about 0 to about 35 with from about 2 to about 15 being preferred, and R$^2$ is an alkyl having from about 1 to about 18 carbon atoms.

The reaction between the (E) primary amine-containing compound and the (D) acylating reaction product can be carried out free of solvent or in a solvent system such as in a lubricating oil.

In the formation of the (D) reaction product, any suitable vessel or device can be utilized such as an extruder, a Banbury, or the like. The blending device desirable imparts a suitable high mechanical energy to the compounds, that is the (D) acylating reaction product and the (D) primary amine-containing compound, such that a solvent-free reaction can be conducted with good mixing of the components. The reaction between the (D) acylating reaction product and the (E) primary amine-containing compound generally takes place upon heating and is from about 50° to about 250° C. with from about 140° to about 180° C. being preferred. Desirably, the reaction takes place in the presence of an inert gas such as nitrogen or argon. The time to carry out the reaction generally depends on the reaction temperature, desired yield and the like. When a blending device such as an extruder is utilized having a relatively small amount reactants therein, the reaction time is generally quite short.

The reaction with the (E) primary amine-containing compound can also be carried out in the presence of one or more solvents. The solvent utilized in the solvent or solution-type reaction can be any common or conventional solvent known to the art or literature. More specifically, the solvent can be the same as set forth hereinabove with regard to the solvated formation of the (D) acylating reaction product. That is, conventional oils generally of lubricating viscosity such as natural and/or synthetic lubricating oils set forth hereinabove can be utilized. A more detailed description of such oils is also set forth hereinbelow. Generally, a neutral lubricating oil is utilized.

The solvent, e.g., lubricating oil, can be added to the reaction vessel, heated and the (D) acylating reaction product added thereto. The (E) primary amine-containing compound can then be added. Although this order of addition is somewhat desirable, it can be varied. Another source of oil is to utilize the solution of (D) acylating reaction product which is carried out in a substantial amount of oil.

The reaction conditions of the (D) acylating reaction product with the (E) primary amine-containing compounds in a solution are essentially the same as that set forth hereinabove with regard to the solvent-free reaction conditions. However, the temperature of reaction is from about 50° C. to about 250° C. and perferably from about 150° C. to 190° C. The reaction is carried out desirably in an inert gas. The amount of the various reactants is also the same as set forth hereinabove.

In any event, it is an important aspect of the present invention that essentially only (E) primary amine-containing compounds be utilized, that is, compounds which contain only one primary amine group therein as described hereinabove.

An effective amount of the (E) primary amine-containing compound is utilized so that an oil-soluble dispersant VI improver is formed. Generally, an amount of the (E) primary amine-containing compound is utilized such that from about 0.1 to about 3.0 primary amine groups exist for each two carbonyl groups or for each anhydride group of said (D) acylating reaction product. Desirably from about 0.5 to about 1.5 primary amine-containing groups exists for each two carbonyl groups or each anhydride group and preferably from about 0.9 to about 1.1 primary amine groups for each two carbonyls or each anhydride group. Naturally, higher or lower amounts can be utilized but tend to be inefficient and/or costly.

The invention will be better understood by reference to the following examples.

EXAMPLE VII

A 3000g sample of the 24.9% polymer solution prepared in Example IV is charged to a 12-1 flask equipped with a mechanical stirrer, thermometer, $N_2$ inlet, addition funnel, Dean-Stark water trap, condenser, and heating mantle. Wibarco Heavy Alkylate (Wibarco Gmbh; 3212.9 g) is charged and the mixture is stirred and heated to 150° C. under a $N_2$ blanket to obtain a homogeneous solution (approx. 2.0 hrs.). When this solution has been obtained, 14.9 g of N,N-dimethyl-1,3-propanediamine (Eastman Kodak Co.) is added dropwise to the mixture from the addition funnel over 0.5 hour. After all the amine has been charged, the reaction mixture is heated to 170° C. and held 3.0 hours. The $N_2$ blanket is changed to a subsurface purge (1.0 SCFH) over the last hour of the reaction period to remove by-product water. This 12% weight polymer solution is the final product. Analytical assay of the final product gives an ANA nitrogen content of 0.065%. Infrared analysis of the product confirms imide formation with no residual anhydride absorptions. The kinematic viscosity at 100° C. of this dispersant-VI concentrate is 240cSt.

An API SF/CC, SAE 15W40 oil was prepared by blending 12.5% weight of the final product from Example VII, 10.6% weight of performance additive A[a]), 0.4% weight Acryloid 156, in a lubricating oil base stock. This oil thereby contains 1.5% weight of the product copolymer. When evaluated in the Caterpillar 1G-2 engine test a TGF=73; WTD=217.6 rating is observed after a 480 hour test period.

An API SF/CC SAE 10W30 oil was prepared by blending 11% weight of the product dispersant-VI, 8.45% weight of Performance Additive B[b]), 0.2% weight Acryloid 156 in a lubricating oil base stock. This oil thus contains 1.32% weight of the product copolymer. When evaluated in the Ford Sequence VD engine test, a merit rating of 9.5 sludge, 7.2 varnish and 6.8 piston skirt varnish is achieved after 192 test hours.

a) Performance additive A: % SA=13.44, % Zn=1.12, % P=1.02, % Ca=2.04, % Mg=0.99, % N=0.25, % S=3.47, TBN=96.9.

b) Performance additive B: % SA=12.29, % Zn=1.56, % P=1.41, % Ca=1.23, % Mg=1.16, % N=0.52, % S=4.27, TBN=85.8.

EXAMPLE VIII

In a manner similar to Example VII, 5500 g of the 10% by wt polymer solution prepared in Example V is charged to a reactor. Diphenylalkane (Vista Chemical Co.; 2332.1 g) is charged and the mixture stirred and heated to 150° C. under a $N_2$ blanket. Once a homogeneous solution has been obtained, 27.3 g of N,N-dimethyl-1,3-propanediamine (Eastman Kodak Co.) is added dropwise to the mixture over 0.5 hours. After all the amine has been charged, the reaction mixture is heated to 170° C. and held for 3.0 hours. The nitrogen blanket is changed to a subsurface purge over the last hour of the reaction period to remove by-product water and yield a final product. Analytical assay of the final product gives an ANA nitrogen content of 0.094% (0.094% theoretical). Infrared analysis of the product confirms imide formation with no residual anhydride absorptions. The kinematic viscosity at 100° C. of this dispersant-VI concentrate is 4353cSt. The product is clear.

An API SF/CC, SAE 10W30 oil is prepared by blending 9.5W of the product dispersant-VI, 4.2% weight of performance additive C[c]), in a lubricating oil base stock. This oil thus contains 0.67% weight of the product copolymer. When evaluated in the Ford Sequence VD engine test, a merit rating of 9.55 sludge, 7.1 varnish, 6.7 piston skirt varnish is achieved after 192 test hours.

c) Performance additive C: % SA=17.4, % Zn=2.45, % P=2 21, % Ca=1.36, % Mg=0.87, % N=0.62% S=5.22, % Na=1.56, TBN=115.9.

EXAMPLE IX 7000 g of the 14.9% by wt polymer solution prepared in Example VI was charged to a flask equipped in a manner as set forth in Example VII. 6067 g Wibarco Heavy Aklylate (Wibarco GmbH) is added and the mixture is heated to 150° C. Once a homogeneous-solution is obtained, 22.5g of N,N-dimethyl-1,3-propanediamine was added dropwise over a ½ hour period. After all the amine had been charged, the reaction vessel is heated to 170° C. and held for 3.0 hours. The nitorgen blanket is changed to a subsurface purge over the last hour of the reaction period to remove by-product water. The 8.0% weight polymer solution gives the final product. Analytical assay of this final product gives an ANA nitrogen content of 0.05% (0.05% theoretical). Infrared analysis of the product confirms imide formation with no residual anhydride absorptions. The appearance of the concentrate was clear.

EXAMPLE X

A maleic anhydride functionalized solvent free polymer as obtained from Example II is reacted with a primary amine compound in the following manner: The solvent free polymer in an amount of 2 carbonyl equivalents (based upon the TAN number) is reacted with one equivalent of a primary amine group in the same type of extruder, that is, a single screw type extruder driven by a C. W. Brabender Plastic-Corder torque rheometer. The temperature of the extruder is approximately 160° C. The primary amine containing compound, N,N-dimethyl-1,3-propanediamine in the above noted amount was premixed with the solvent free polymer and both added to the feed portion of the extruder. Residence time of the extruder was approximately 20 seconds. The imidized neat polymer in an amount of 12% by weight was dissolved into Wibarco Heavy Aklylate. The kinematic viscosity at 100° C. of the dispersant-VI concentrate was 760cSt.

Should relatively small amounts of polyamines containing two or more primary amino groups be utilized to react with the (D) acylating reaction product containing an acid group or anhydride group, viscosity of the product increases dramatically and gel is often formed thereby yielding an insoluble material. However, it is possible that polyamines, containing two or more primary amino groups can be utilized to manufacture an oil soluble effective VI improver/dispersant product. This depends upon the functionality of the polyamine and the (D) acylating reaction product.

The gel formation point is theoretically predicted by mathematical formulas as set forth in Prof. George Odian's textbook, *Principles of Polymerization*, 2 nd Edition 1970, McGraw Hill Book Co., New York, N.Y., pp. 96–107, which is hereby fully incorporated by reference.

Accordingly, assume that diethylene triamine (DETA) is used as a polyamine to react with the (D) acylating reaction product. DETA has the functionality of two because it contains two primary amino groups per molecule. If the number average functionality of the (D) acylating reaction products is two or less, the theory predicts that no gel, a crosslinked product, would be formed. If said functionality, however, is greater than two, a gel is predicted to form. The theories teach that the greater the functionality, the greater the gelation. Even if the functionally is two or less, the oil-soluble product can be undesirable because the viscosity will be increased excessively in many cases.

The number of the anhydride groups attached to each molecule of (D) depends upon the average molecular weight of the (A) block copolymer and the TAN of (D) copolymer. The following table illustrates this aspect.

| Number Average Mol. Wt. of (A) | Total Acid Number (TAN) of (D) | | | | | |
|---|---|---|---|---|---|---|
| 50,000 | 2.2 | 3.4 | 4.5 | 5.6 | 22 | 44 |
| 70,000 | 1.6 | 2.4 | 3.2 | 4.0 | 16 | 32 |
| 100,000 | 1.12 | 1.7 | 2.2 | 2.8 | 11 | 22 |
| 150,000 | 0.75 | 1.1 | 1.5 | 1.9 | 7.5 | 15 |
| 200,000 | 0.56 | 0.84 | 1.1 | 1.4 | 5.6 | 11.2 |
| 300,000 | 0.37 | 0.56 | 0.75 | 0.93 | 3.7 | 7.5 |
| Number Average Functionality* | 1.0 | 1.5 | 2.0 | 5.0 | 10 | 20 |

-continued

| Number Average Mol. Wt. of (A) | Total Acid Number (TAN) of (D) |
|---|---|
| of (D) | |

*Number of anhydride groups attached to each polymer molecule.

On the other hand, a compound (E) containing only one primary amine group as set forth above, will form an oil soluble product regardless of the functionality of (D).

According to the present invention, it is required that the VI improvers/dispersants of the present invention be oil-soluble so that they can be utilized in various lubricating applications as set forth hereinbelow. As illustrative of this fact, examples are presented showing the criticality of utilizing essentially only compounds containing one primary amine group therein.

As previously indicated, the products of the present invention are suitable as VI improvers/dispersants. Accordingly, the composition of the present invention can be effectively employed in a variety of lubricating compositions formulated for a variety of uses. These lubricating compositions are based on diverse oils of lubricating viscosity, including natural and synthetic lubricating oils and mixtures thereof. These lubricating compositions containing the subject additive concentrates are effective as crankcase lubricating oils for spark-ignited and compression-ignited internal combustion engines, including automobile and truck engines, two-cycle engines, aviation piston engines, marine and low-load diesel engines, and the like. Also, automatic transmission fluids, transaxle lubricants, gear lubricants, metal-working lubricants, hydraulic fluids, and the other lubricating oil and grease compositions can benefit from the incorporation of the subject additive concentrates.

The following description with regard to the natural as well as synthetic lubricating oils in which the VI improver/dispersant can be utilized are also applicable solvents for either the (D) acylating reaction product formation or the subsequent reaction of the reaction product with the (E) primary amine-containing compound. Accordingly, it is to be understood that the following list of compounds can be utilized as a solvent in the above-described reactions. Examples of natural oils include animal oils and vegetable oils ( e.g., castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful. Synthetic lubricating oils include hydrocarbon oils and halo-substituted hydrocarbon oils such as polymerized and interpolymerized olefins (e.g., oligobutylenes, oligopropylenes, and propylene-ethylene oligomers, chlorinated polybutylenes, etc.); oligo (1-hexenes), oligo(1-octenes), oligo(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having an average molecular weight of about 500–1000, diethyl ether of polypropylene glycol having an average molecular weight of about 1000–1500, etc.) or mono- and polycarboxylic esthers thereof. For example, the acetic acid esters, mixed $C_3$–$C_8$ fatty acid esters, or the $C_{13}$ oxo acid diester of tetraethylene glycol.

Another suitable class of synthetic lubricating oils that can be used comprises the esters of di-carboxylic acids (e.g., phthalic acid, succinic acid, alkylsuccinic acid, alkenylsuccinic acid, maleic acid, azelaic acid, suberic acid, sebacic acid, fumaric acid, adipic acid, linoleic acid dimer, malonic acid, alkylmalonic acids, alkenylmalonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include butyl adipate, (2-ethylhexyl) sebacate, n-hexyl fumarate, octyl sebacate, isooctyl azelate, isodecyl azelate, octyl phthalate, decyl phthalate, eicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, etc.

Silicon-based oils such as the polyalkyl-, polyaryl -, polyalkoxy-, or polyaryloxy-siloxane oils and silicate oils comprise another useful class of synthetic lubricants (e.g., tetraethyl silicate, tetraisopropyl silicate, tetra-(2-ethylhexyl) silicate, tetra-(4-methyl-2-hexyl) silicate, tetra-(p-tert-butylphenyl) silicate, hexa-(4-methyl-2-pentoxy)-disiloxane, poly(methylsiloxanes), poly(methylphenylsiloxanes), etc.).

Unrefined, refined and rerefined oils, either natural or synthetic (as well as mixtures of two or more of any of these) of the type disclosed hereinabove can be used in the concentrates of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated with one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils and to refined oils which have been already used in service. Such rerefined oils are also known as reclaimed or reprocessed oils and often are additionally processed by techniques directed to removal of spent additives and oil breakdown products.

Generally the lubricants of the present invention contain an amount of one or more of the viscosity improver compositions of this invention sufficient to provide them with suitable viscosities. Normally the amount employed will be about 0.01 percent to about 20 percent, preferably about 0.1 percent to about 4 percent of the weight of the (D) reaction product or the (E) dispersant derivatives thereof based upon the total weight of the lubricating composition.

The invention also contemplates the use of other additives in combination with the viscosity improver compositions of this invention. Such additives include, for example, detergents and dispersants of the ash-producing or ashless type, corrosion- and oxidation-inhibiting agents, pour point depressing agents, extreme pressure agents, anti-wear agents, color stabilizers and anti-foam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a number average molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess .of a metal neutralizing agent such as the metal oxide, hydroxide, carbonate, bicarbonate, or sulfide at a temperature of about 50° C. and filtering the resulting mass. The use of a "promoter" in the neutralization step to aid the incorporation of a large excess of metal likewise is known. Examples of compounds useful as the promoter include phenolic substances such as phenol, naphthols, alkylphenols, thiophenol, sulfurized alkylphenols, and condensation products of formaldehyde with phenolic substance; alcohols such as methanol, 1-propanol, octyl alcohol, cellosolve, carbitol, ethylene glycol, stearyl alcohol, and cyclohexyl alcohol; and amines such as aniline, phenylenediamine, phenothiazine, N-phenylbeta-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricant compositions of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent 1,306,529 and in many U.S. patents including the following:

| | | |
|---|---|---|
| 3,163,603 | 3,351,552 | 3,541,012 |
| 3,184,474 | 3,391,022 | 3,542,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | 4,234,435 |
| 3,346,493 | 3,522,179 | Re 36,433 |

(2) Reaction products of relatively high molecular weight aliphatic or alicyclic halides with amines, preferably oxyalkylene polyamines. These may be characterized as "amine dispersants" and examples thereof are described. For example, in the following U.S. patents:

| | |
|---|---|
| 3,275,554 | 3,454,555 |
| 3,438,757 | 3,565,804 |

(3) Reaction products of alkylphenols in which the alkyl group contains at least about 30 carbon atoms with aldehydes (especially formaldehyde) and amines (especially polyalkylene polyamines), which may be characterized as "Mannich dispersants". The materials described in the following U.S. Patents are illustrative:

| | | |
|---|---|---|
| 2,459,112 | 3,442,808 | 3,591,598 |
| 2,962,442 | 3,448,047 | 3,600,372 |
| 2,984,550 | 3,454,497 | 3,634,515 |
| 3,036,003 | 3,459,661 | 3,649,229 |
| 3,166,516 | 3,461,172 | 3,697,574 |
| 3,236,770 | 3,493,520 | 3,725,277 |
| 3,355,370 | 3,539,633 | 3,725,480 |
| 3,368,972 | 3,558,743 | 3,726,882 |
| 3,413,347 | 3,586,629 | 3,980,569 |

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,445,831 | 3,591,598 | 3,704,308 |
| 3,281,428 | 3,455,832 | 3,600,372 | 3,708,422 |

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated by reference herein for their disclosure of ashless dispersants.

Extreme pressure agents and corrosion- and oxidation-inhibiting agents which may be included in the lubricants of the invention are exemplified by chlorinated aliphatic hydrocarbons such as chlorinated wax; organic sulfides and polysulfides such as benzyl disulfide, (chlorobenzyl) disulfide, butyl tetrasulfide, sulfurized methyl ester of oleic acid, sulfurized alkylphenols, sulfurized dipentene, and sulfurized terpenes; phosphosulfurized hydrocarbons such as the reaction product of a phosphorus sulfide with turpentine or methyl oleate, phosphorus esters including principally dihydrocarbon and trihydrocarbon phosphites such as dibutyl phosphite, diheptyl phosphite, dicyclohexyl phospite, pentyl phenyl phosphite, dipentyl phenyl phosphite, tridecyl phosphite, distearyl phosphite, dimethyl naphthyl phospite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyldithiocarbamate; Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Many of the above-mentioned auxiliary extreme pressure agents and corrosion-oxidation inhibitors also serve as anti-wear agents. Zinc dialkylphosphorodithioates are well known examples.

Pour point depressants are particularly useful types of additive often included in the lubricating oils described herein. The use of such pour point depressants in oil-based compositions are well known in the art. See, for example, page 8 of *Lubricant Additives* by C. V. Smalheer and R. Kennedy Smith Lezius-Hiles Co. publishers, Cleveland, Ohio, 1967.

Examples of useful pour point depressants are polymethacrylates; polyacrylates; polyacrylamides; condensation products of haloparaffin waxes and aromatic compounds; vinyl carboxylate polymers; and terpolymers of dialkyl fumarates, vinyl esters of fatty acids and alkyl vinyl ethers. Pour point depressants useful for the purposes of this invention, techniques for their preparation and their uses are described in U.S. Pat. Nos. 2,387,501; 2,015,748; 2,655,479; 1,815,022; 2,191,498; 2,666,746; 2,721,877; 2,721,878; and 3,250,715 which are hereby incorporated by reference for their relevant disclosures.

Anti-foam agents are used to reduce or prevent the formation of stable foam. Typical anti-foam agents include silicones or organic polymers. Additional anti-foam compositions are described in *Foam Control Agents*, by Henry T. Kerner, Noyes Data Corporation. 1976, pages 125–162.

The compositions of this invention can be added directly to the lubricant.. Preferably, however, they are diluted with a substantially inert, normally liquid organic diluent such as mineral oil, naphtha, benzene, toluene or xylene, to form an additive concentrate. These concentrates usually contain from about 1 percent to about 40 percent by weight and desirably from about 4 percent to about 25 percent by weight of the dispersant-VI improvers of the present invention, that is, the (D) reaction product or the (E) dispersant derivatives thereof based upon the total weight of the lubricating compositions. Moreover, the lubricating composition can contain, in addition, one or more other additives known in the art or described hereinabove. The remainder of the concentrate is the substantially inert liquid diluent.

While in accordance with the patent statutes a best mode and preferred embodiment have been set forth. It is to be understood that the various modifications thereof will become apparent to those skilled in the art upon reading of the specification. Therefore, it is to be understood that the invention disclosed herein is intended to cover such modifications as fall within the scope of the claims.

What is claimed is:

1. A lubricant or additive concentrate composition comprising a diluent oil and from about 0.01 percent by weight to about 90 by weight of (D) a reaction product of:

(A) a hydrgenated block copolymer that contains no more than 0.5 percent residual olefinic unsaturation therein based upon the total number of carbon-to-carbon covalent linkages comprising a hydrogenated normal block copolymer or a hydrogenated random block copolymer, said normal block copolymer made from a vinyl substituted aromatic wherein said vinyl substituted aromatic has from 8 to 12 carbon atoms, and an aliphatic conjugated diene wherein said conjugated diene has from 4 to 10 carbon atoms, said normal block copolymer having from two to about five polymer blocks with at least one polymer block of said vinyl substituted aromatic and at least one polymer block of said hydrogenated aliphatic conjugated diene, said random block copolymer made from vinyl substituted aromatic and aliphatic conjugated diene monomers, the total amount of said vinyl substituted aromatic blocks in said block copolymer being in the range of from about 20 percent to about 70 percent by weight and the total amount of said diene blocks in said block copolymer being in the range of from about 30 percent to about 80 percent by weight; the number average molecular weight of said normal block copolymer and said random block copolymer being in the range of about 10,000 to about 500,000;

(B) an alpha beta olefinic unsaturated carboxylic reagent including functional derivatives thereof containing 2 to about 20 carbon atoms exclusive of the carboxyl-based groups wherein said (B) unsaturated carboxylic reagent is selected from the group consisting of anhydride, ester, acyl halide, nitrile and metal salts thereof, and an acid having the formula

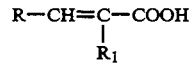

wherein R is hydrogen or an unsaturated aliphatic or heterocyclic group, $R_1$ is hydrogen or a lower alkyl group and the total number of carbon atoms in R and $R_1$ does not exceed 18 carbon atoms, in an mount of from about 0.25 percent to about 20 percent by weight based upon the total weight of said (A) block copolymer and said (B) unsaturated carboxylic reagent; and from about 0.01 to about 5 percent by weight of (C) a free radical initiator based upon the weight of said (A) block copolymer and said (B) unsaturated carboxylic reagent.

2. The composition of matter according to claim 1, wherein said reaction occurs in the presence of a temperature of from about 100° C. about 300° C., wherein said reaction occurs in the presence of high mechanical energy and wherein said (A) normal block copolymer is a linear block copolymer.

3. The composition according to claim 1, wherein said (A) normal block copolymer has a total of two or three polymer blocks, wherein the number average molecular weight of said block and said random copolymer is from about 30,000 to about 200,000, wherein in said block copolymer the total amount of said conjugated diene is from about 40 percent to about 60 percent by weight and the total amount of said vinyl substituted aromatic is from about 40 percent to about 60 percent by weight.

4. The composition according to claim 3, wherein said (B) unsaturated carboxylic reagent is selected from the group consisting of maleic anhydride, citraconic anhydride, itaconic anhydride, glutaconic anhydride, chloromaleic anhydride, methyl maleic anhydride, acrylic acid, methacrylic acid, fumaric acid, maleic acid, lower alkyl esters of such acids, and combinations thereof, and wherein the amount of said (B) unsaturated carboxylic reagent is from about 0.5 to about 5.0 percent by weight.

5. The composition according to claim 4, wherein said conjugated diene is isoprene or butadiene, wherein said vinyl substituted aromatic is styrene, and wherein said reaction product has a total acid number of from about 0.1 to about 60.

6. The composition according to claim 5, wherein said reaction temperature is from about 160° C. to about 260° C.

7. The composition according to claim 2, wherein said free (C) radical initiator is an organic peroxide or an organic azo initiator.

8. The composition according to claim 7, wherein said reaction product has a total acid number of from about 0.5 to about 20 and wherein said (B) unsaturated carboxylic reagent is selected from the group consisting of fumaric acid, maleic acid and maleic anhydride.

9. An additive concentrate according to claim 8 having from about 5 percent by weight to about 90 percent by weight of the reaction product.

10. A lubricant composition comprising a major amount of mineral oil and from about 0.01 percent to about 20 percent of the composition of claim 1.

11. A lubricant composition comprising a major amount of a mineral oil and from about 0.01 percent to about 20 percent of the composition of claim 7.

* * * * *